US010498390B2

(12) United States Patent
Sharples et al.

(10) Patent No.: US 10,498,390 B2
(45) Date of Patent: Dec. 3, 2019

(54) RESOURCE ALLOCATION IN A DSL NETWORK (71) Applicant: BRITISH TELECOMMUNICATIONS PUBLIC LIMITED COMPANY, London (GB)

(72) Inventors: Peter Sharples, London (GB); Trevor Linney, London (GB)

(73) Assignee: BRITISH TELECOMMUNICATIONS public limited company, London (GB)

(*) Notice: Subject to any disclaimer, the term of this patent is extended or adjusted under 35 U.S.C. 154(b) by 308 days.

(21) Appl. No.: 15/117,560

(22) PCT Filed: Feb. 18, 2015

(86) PCT No.: PCT/GB2015/050455
§ 371 (c)(1),
(2) Date: Aug. 9, 2016

(87) PCT Pub. No.: WO2015/124916
PCT Pub. Date: Aug. 27, 2015

(65) Prior Publication Data
US 2016/0373163 A1 Dec. 22, 2016

(30) Foreign Application Priority Data
Feb. 20, 2014 (EP) .................... 14250027

(51) Int. Cl.
H04B 3/32 (2006.01)
H04M 3/22 (2006.01)
(Continued)

(52) U.S. Cl.
CPC ............ *H04B 3/32* (2013.01); *H04M 3/2263* (2013.01); *H04L 5/0066* (2013.01); *H04L 47/765* (2013.01)

(58) Field of Classification Search
CPC ........ H04L 12/2892; H04L 2012/6478; H04M 11/062; H04Q 3/60; H04Q 11/04
See application file for complete search history.

(56) References Cited

U.S. PATENT DOCUMENTS 6,578,005 B1 * 6/2003 Lesaint .................. G06Q 10/06
705/7.14
6,985,444 B1 * 1/2006 Rosen ..................... H04L 41/00
370/241

(Continued)

FOREIGN PATENT DOCUMENTS

EP     1 370 057        12/2003
EP     1 370 057 A1     12/2003

(Continued)

OTHER PUBLICATIONS

International Search Report for PCT/GB2015/050455 dated Apr. 23, 2015, 4 pages (Cited in Applicant'S IDS of Aug. 9, 2016) (Year: 2015).*

(Continued)

*Primary Examiner* — Berhanu Tadese
(74) *Attorney, Agent, or Firm* — Nixon & Vanderhye P.C.

(57) ABSTRACT

A method and device are provided for allocating resources in a DSL network, comprising the steps of a first-tier DSL network element receiving a resource requirement of a second-tier DSL subscriber line, the first-tier DSL network element determining a resource requirement of a first-tier DSL subscriber line, and the first-tier DSL network element allocating resources to the first-tier DSL subscriber line based on the resource requirements of the first and second tier DSL subscriber lines.

20 Claims, 4 Drawing Sheets (51) Int. Cl.
*H04L 5/00* (2006.01)
*H04L 12/919* (2013.01)

(56) References Cited

U.S. PATENT DOCUMENTS

| | | | | |
|---|---|---|---|---|
| 8,582,425 B1* | 11/2013 | Turner | ............... | H04B 3/32 370/222 |
| 2003/0053443 A1* | 3/2003 | Owens | ............... | H04L 12/6418 370/352 |
| 2003/0227938 A1* | 12/2003 | Slabbinck | ............ | H04M 11/062 370/465 |
| 2006/0098725 A1* | 5/2006 | Rhee | ............... | H04B 3/48 375/222 |
| 2007/0014306 A1* | 1/2007 | Tirri | ............... | H04L 12/2892 370/463 |
| 2007/0248007 A1* | 10/2007 | Rajan | ............... | H04L 12/2878 370/230 |
| 2008/0222289 A1* | 9/2008 | Conway | ............... | G06Q 10/06 709/225 |
| 2009/0089431 A1* | 4/2009 | Kim | ............... | H04L 63/0272 709/226 |
| 2009/0103559 A1* | 4/2009 | Pickering | ............ | H04L 12/2856 370/463 |
| 2009/0262697 A1* | 10/2009 | To | ............... | H04W 72/10 370/329 |
| 2010/0183062 A1* | 7/2010 | Everett | ............... | H04L 41/0806 375/222 |
| 2010/0202441 A1* | 8/2010 | Haag | ............... | H04L 12/287 370/352 |
| 2010/0205169 A1* | 8/2010 | Narayan | ............... | H04L 67/306 707/711 |
| 2010/0299432 A1* | 11/2010 | Emanuel | ............... | G06F 16/954 709/224 |
| 2011/0051906 A1* | 3/2011 | Cioffi | ............... | H04B 3/32 379/32.04 |
| 2011/0106932 A1* | 5/2011 | Fallon | ............... | H04L 41/044 709/223 |
| 2012/0039187 A1* | 2/2012 | Yang | ............... | H04B 3/46 370/249 |
| 2012/0202441 A1* | 8/2012 | Mimino | ............... | G01R 21/10 455/115.1 |
| 2012/0275576 A1* | 11/2012 | Wei | ............... | H04B 3/32 379/32.04 |
| 2014/0105604 A1* | 4/2014 | Luo | ............... | H04L 25/085 398/98 |
| 2014/0254791 A1* | 9/2014 | Wei | ............... | H04M 11/062 379/406.01 |
| 2015/0055449 A1* | 2/2015 | Li | ............... | H04L 1/0072 370/216 |
| 2016/0036491 A1* | 2/2016 | Sorbara | ............... | H04B 3/32 370/294 |
| 2016/0205264 A1* | 7/2016 | Kerpez | ............... | H04M 11/062 379/406.01 |
| 2016/0234079 A1* | 8/2016 | Lee | ............... | H04L 12/2856 |
| 2016/0373163 A1* | 12/2016 | Sharples | ............... | H04B 3/32 |
| 2017/0085719 A1* | 3/2017 | Linney | ............... | H04M 11/062 |

FOREIGN PATENT DOCUMENTS

| | | | |
|---|---|---|---|
| EP | 1 220 492 B1 | 8/2005 | |
| EP | 2 559 309 | 2/2013 | |
| KR | 10-2005-0001970 | 1/2005 | |
| WO | 2008/104821 A1 | 9/2008 | |
| WO | WO 2008/104821 | 9/2008 | |
| WO | WO-2008104821 A1 * | 9/2008 | ......... H04L 12/2856 |
| WO | 2010/105248 A1 | 9/2010 | |
| WO | WO 2010/105248 | 9/2010 | |
| WO | WO-2010105248 A1 * | 9/2010 | .......... H04J 14/0282 |
| WO | 2011/130447 A1 | 10/2011 | |
| WO | WO-2013017816 A1 * | 2/2013 | ........... G06F 9/5005 |
| WO | WO 2013017816 A1 * | 2/2013 | ........... G06F 9/5005 |
| WO | WO 2015124916 A1 * | 8/2015 | ............... H04B 3/32 |
| WO | WO-2015124916 A1 * | 8/2015 | |
| WO | WO-2015150732 A1 * | 10/2015 | |
| WO | WO 2015150732 A1 * | 10/2015 | ............... H04B 3/32 |
| WO | WO-2016015951 A1 * | 2/2016 | .......... H04M 11/062 |
| WO | WO 2016015951 A1 * | 2/2016 | .......... H04M 11/062 |

OTHER PUBLICATIONS

International Search Report for PCT/GB2015/050455 dated Apr. 23, 2015, 4 pages (Cited in IDS of Aug. 9, 2016) (Year: 2015).*
European Search Report dated Aug. 8, 2014 issued in corresponding European Application No. 14250027.1 (6 pgs.) (Cited in IDS of Oct. 25, 2016) (Year: 2014).*
Specification of the Access Network Frequency Plan applicable to transmission systems connected to the BT Access Network, Issue 5; NICC ND 1602 V5.1.1 (Sep. 2011) (42 pgs.) (Cited in IDS of Oct. 25, 2016) (Year: 2011).*
Report onDynamic Spectrum Management (DSM) Methods in the UK Access Network, NICC ND 1513 (Jan. 2010) (Cited in IDS of Oct. 25, 2016) (Year: 2010).*
International Search Report for PCT/GB2015/050455 dated Apr. 23, 2015, 4 pages.
European Search Report dated Aug. 8, 2014 issued in corresponding European Application No. 14250027.1 (6 pgs.).
Specification of the Access Network Frequency Plan applicable to transmission systems connected to the BT Access Network, Issue 5; NICC ND 1602 V5.1.1 (Sep. 2011) (42 pgs.).
Report on Dynamic Spectrum Management (DSM) Methods in the UK Access Network, NICC ND 1513 (Jan. 2010) (53 pgs.).

* cited by examiner

PRIOR ART

RESOURCE ALLOCATION IN A DSL NETWORK

This application is the U.S. national phase of International Application No. PCT/GB2015/050455 filed 18 Feb. 2015 which designated the U.S. and claims priority to EP Application No. 14250027.1 filed 20 Feb. 2014, the entire contents of each of which are hereby incorporated by reference.

FIELD OF THE INVENTION

The present invention relates to resource allocation in a Digital Subscriber Line (DSL) network.

BACKGROUND TO THE INVENTION

A DSL connection provides digital communication over existing twisted copper pair subscriber lines. The term DSL is a collective term to cover a number of variations on the DSL technology, including Asymmetric DSL (ADSL), Symmetric DSL (SDS), ADSL2+ and Very high data rate DSL (VDSL). A DSL connection comprises a copper subscriber line extending between two DSL modems. A first DSL modem is typically located at the customer's premises, and the second modem may be located at the local exchange (known as the 'central office' in US terminology), a street cabinet, or distribution point (sometimes known as 'drop point'). Typically, the local exchange, street cabinet or distribution point includes a DSL Access Multiplier, DSL Access Multiplier (DSLAM) (a form of aggregation transceiver device) comprising several DSL modems (one for each subscriber line). The DSLAM (at the exchange, cabinet or distribution point) connects the first DSL modem at the customer's premises to the Core Network, typically over a faster optical fibre connection, and a Network Management System.

Figure 1:
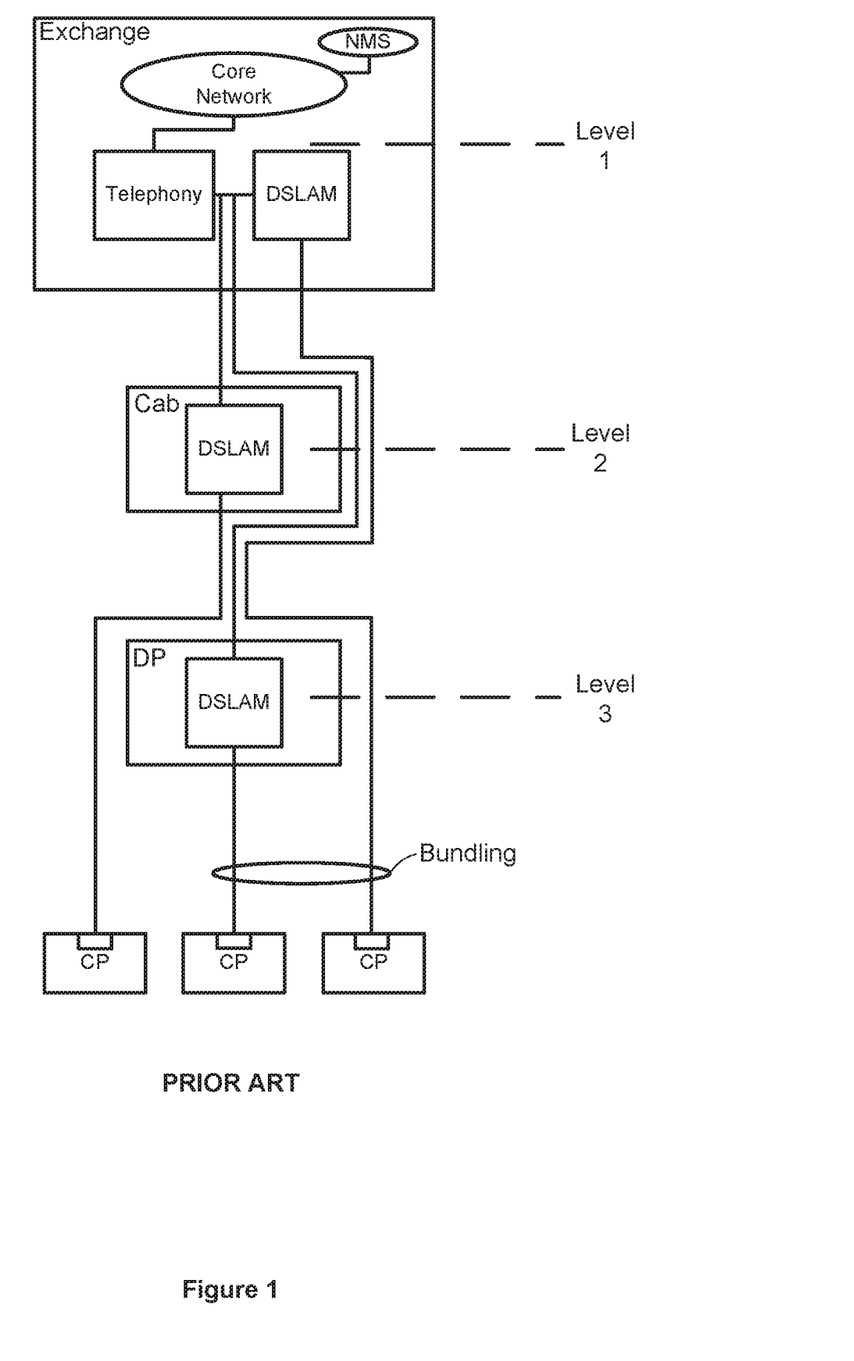
FIG. 1 is a schematic diagram of a DSL network of the prior art.

FIG. 1 illustrates a hierarchical relationship between the local exchange, street cabinet, distribution point and customer premises. The local exchange DSLAM is at level 1 of the hierarchy and connects a first set of customers' DSL modems to a Core Network. The street cabinet DSLAM is at level 2 of the hierarchy and connects a second set of customers' DSL modems to the Core Network through the exchange. The distribution point DSLAM is at level 3 of the hierarchy and connects a third set of customers' DSL modems to the Core Network through the exchange. All levels of the DSL hierarchy may transmit data over the same frequency domain.

It is well-known that transmissions on one subscriber line may cause interference on another subscriber line. This is known as 'crosstalk'. Furthermore, it is common for the different sets of customers' DSL modems to be bundled together (for example, a subscriber line between one of the first set of customers' DSL modems and the local exchange may be bundled together with a subscriber line between one of the third set of customers' DSL modems and the distribution point, as shown in FIG. 1). However, subscriber lines between higher-tier DSLAMs and their customers' DSL modems tend to be significantly longer than subscriber lines for lower-tier DSLAMs, such that a signal on the longer subscriber line is significantly attenuated by the point at which it is bundled together with the subscriber lines for lower-tier DSLAMs. Thus, full power transmissions by lower-tier DSLAMs cause high levels of crosstalk on the higher-tier subscriber lines on the same frequency.

This problem has been addressed by a technique called the Access Network Frequency Plan, ANFP. The ANFP preserves resources for the exchange by defining the Power Spectral Density, PSD, of transmissions by lower-tier DSLAMs. For example, the PSD for the cabinet's DSLAM is shaped such that the power level at any frequency that is also being used by the exchange DSLAM is reduced. This decreases the chance of crosstalk on the DSL connections between the exchange and the customer. This technique may also be applied to the distribution point's DSLAM (such that the PSD is shaped according to the resources being used by the street cabinet and the exchange).

In order to provide customers with higher data rates, the location of the DSLAM is generally moving closer to the customer (i.e. from the exchange towards the distribution point). Thus, connections between the local exchange and the street cabinet and distribution points are being replaced with optical fibre, such that the length of the copper subscriber line (with its inherent data rate limitations) is reduced. There is therefore a trend in providing a greater number of DSLAMs in the street cabinets and distribution points.

The present inventors have identified a problem with the ANFP. Although the ANFP reduces the chance of crosstalk on the higher-tier DSL connections, the technique also reduces the capacity of the lower-tier DSLAMs when there is an overlap in the frequencies used by both the lower and higher tier DSLAMs. As DSLAMs migrate closer to the customer, the ANFP technique will become increasingly more inefficient in terms of the total capacity of the network.

Furthermore, the prior art techniques involve the Network Management System determining the resource allocations for subscriber lines offline. This is a manual and time-consuming process for the Network Operator. Once the resources have been allocated, the Network Management System sends an allocation message to the DSLAM, which then implements the resource allocation to the line on the next retrain. These retrains are particularly frustrating for the end-user as they result in several minutes of loss of service. Accordingly, the Network Operator must either wait for the line to retrain, or force a retrain on the line at an appropriate time (e.g. during the middle of the night). However, either way, there is a significant delay before the resource allocations for all lines in the network have been implemented.

It is therefore desirable to alleviate some or all of the above problems.

SUMMARY OF THE INVENTION

According to a first aspect of the invention, there is provided a method for allocating resources in a DSL network, the DSL network having a hierarchy including a first and second tier, the method comprising the steps of: a first-tier DSL network element receiving a resource requirement of a second-tier DSL subscriber line; the first-tier DSL network element determining a resource requirement of a first-tier DSL subscriber line; and the first-tier DSL network element allocating resources to the first-tier DSL subscriber line based on the resource requirements of the first and second tier DSL subscriber lines.

The present invention therefore provides an improved method for allocating resources in a DSL network, as resources may be allocated according to the requirements of several tiers. In the prior art ANFP technique, resources were preserved for higher-tiers and thus reduced for lower-tiers without any knowledge of the requirements for those lower-tiers. However, the method of the present invention may allocate resources to high-tier connected customers (e.g. exchange connected customers) based on the resource requirements of lower-tier connected customers (e.g. cabinet and distribution point connected customers). The method may therefore allocate resources to each level in a manner that uses a greater proportion of the total capacity of the DSL network.

The skilled person will understand that this is particularly important as the length of the copper subscriber line shortens and a greater proportion of DSLAMs are located in the cabinet or distribution points.

Furthermore, the present invention may include messages being transmitted between network elements in separate tiers of the DSL network indicating the resource requirements for a particular tier. This allows the network elements to determine the requirements of several tiers autonomously (i.e. without the involvement of the Network Management System), and allocate resources accordingly. Thus, the computational burden on the Network Management System is reduced.

The method may further comprise the steps of: a second-tier DSL network element determining the resources allocated to the first-tier DSL subscriber line; and the second-tier DSL network element allocating resources to the second-tier DSL subscriber line based on the resources allocated to the first-tier DSL subscriber line. For example, the cabinet connected subscriber lines may be allocated resources based on the resources already allocated to the exchange connected subscriber lines.

The DSL hierarchy may further include a third tier, and the method may further comprise the steps of: the first-tier DSL network element receiving a resource requirement of the second-tier DSL subscriber line and a third-tier DSL subscriber line; and the first-tier DSL network element allocating resources to the first-tier DSL subscriber line based on the resource requirements of the first, second and third DSL subscriber lines.

The method may further comprise the steps of: the second-tier DSL network element determining the resources allocated to the first-tier DSL subscriber line; and the second-tier DSL network element allocating resources to the second-tier DSL subscriber line based on the resources allocated to the first-tier DSL subscriber line and the resource requirements of the third DSL subscriber line. For example, the cabinet connected subscriber lines may be allocated resources based on the resources already allocated to the exchange connected subscriber lines and the resource requirements of the distribution point connected subscriber lines.

The method may further comprise the steps of: the third-tier DSL network element determining the resources allocated to the first-tier and second-tier DSL subscriber lines; and the third-tier DSL network element allocating resources to the third-tier DSL subscriber line based on the resources allocated to the first-tier and second-tier DSL subscriber lines.

The second and third tier subscriber lines may determine the resources allocated to the higher-tier subscriber lines by receiving an allocation signal from the higher-tier DSL network elements or by detection.

The first, second or third DSL network elements may also implement the resource allocations to the first, second or third DSL subscriber lines by On-Line Reconfiguration (OLR). Thus, the present invention provides a method for the network elements (e.g. the DSLAMs) to allocate resources for a tier based on the resource requirements of several tiers (due to the inter-tier signalling messages indicating the resource requirements), which may be applied to the DSL subscriber lines automatically by OLR. The present invention may therefore be an entirely automatic and seamless method, and the retrains of the prior art techniques are no longer required.

The first, second or third DSL network elements may also allocate resources based on a topology of the DSL network. The DSL network elements may be aggregation transceiver devices, such as DSLAMs. Alternatively, the DSL network elements may be a stand-alone device. The device may be connected to an aggregation transceiver device.

A computer program stored on a computer-readable medium which, when executed on a computer, causes the computer to perform the steps of the method of the first aspect of the invention is also provided.

According to a second aspect of the invention, there is provided a device for allocating resources in a DSL network, the DSL network having a hierarchy including a first and second tier, the device disposed on the first-tier and comprising a receiver adapted to receive resource requirement data relating to a second-tier DSL subscriber line; and a processor adapted to determine a resource requirement of a first-tier DSL subscriber line, and further adapted to allocate resources to the first-tier DSL subscriber line based on the resource requirements of the first-tier and second-tier DSL subscriber lines.

The DSL network hierarchy may further include a third tier, and the receiver may be further adapted to receive resource requirement data relating to the third-tier DSL subscriber line, and the processor may be further adapted to allocate resources to the first-tier DSL subscriber line based on the resource requirements of the first-tier, second-tier and third-tier DSL subscriber lines.

According to a third aspect of the invention, there is provided a device for allocating resources in a DSL network, the DSL network having a hierarchy including a first and second-tier, the device disposed on the second-tier and comprising a processor adapted to determine a resource requirement of a second-tier DSL subscriber line; and a transmitter adapted to send the resource requirement of the second-tier DSL subscriber line to a first-tier network element, wherein the processor is further adapted to: determine resources allocated to a first-tier DSL subscriber line by the first-tier network element, and allocate resources to the second-tier DSL subscriber line based on the resources allocated to the first-tier DSL subscriber line.

The DSL network hierarchy may further include a third tier, and the transmitter may be a transceiver adapted to receive the resource requirements of a third-tier DSL subscriber line and to send the resource requirement of the third-tier DSL subscriber line to the first-tier network element.

The processor may be further adapted to allocate resources to the second-tier DSL subscriber line based on the resources allocated to the first-tier DSL subscriber line and the resource requirements of the third-tier DSL subscriber line.

BRIEF DESCRIPTION OF THE FIGURES

In order that the present invention may be better understood, embodiments thereof will now be described, by way of example only, with reference to the accompanying drawings in which.

DETAILED DESCRIPTION OF EMBODIMENTS

Figure 2:
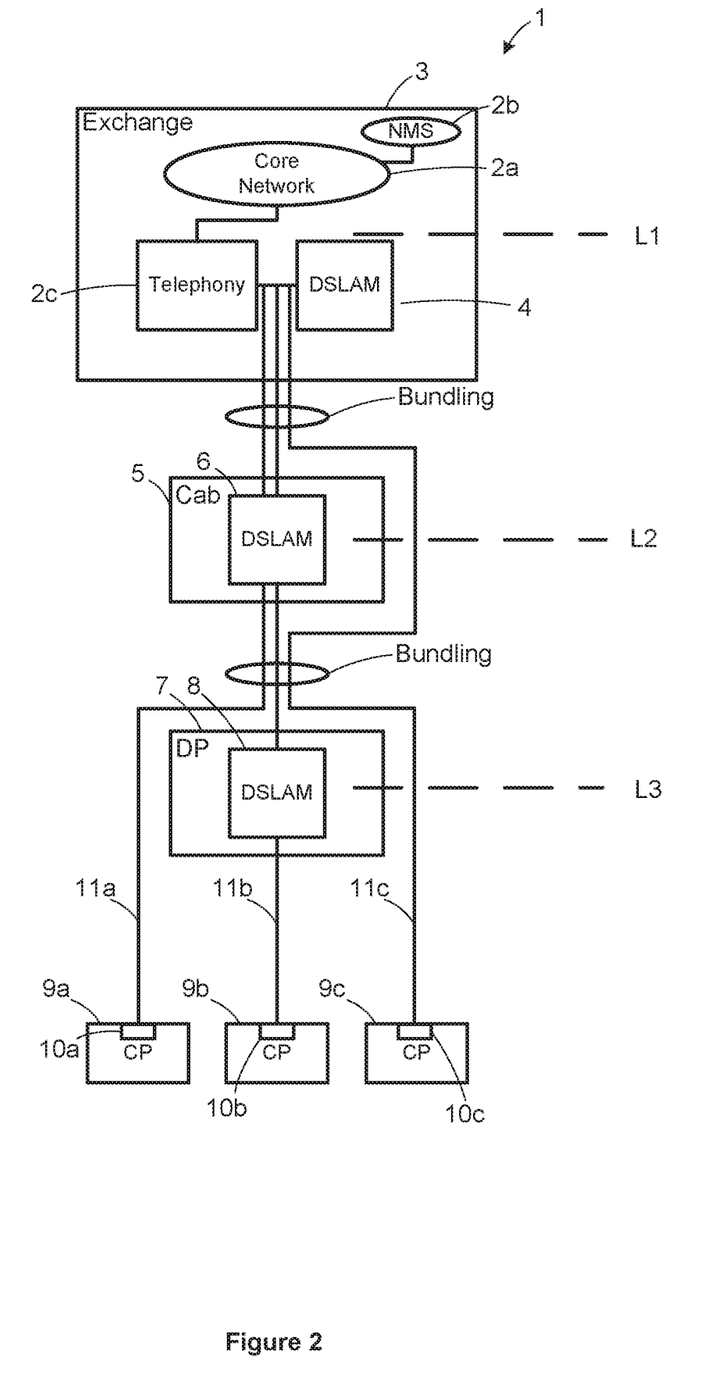
FIG. 2 is a schematic diagram of a first embodiment of a DSL network of the present invention.
Figure 4:
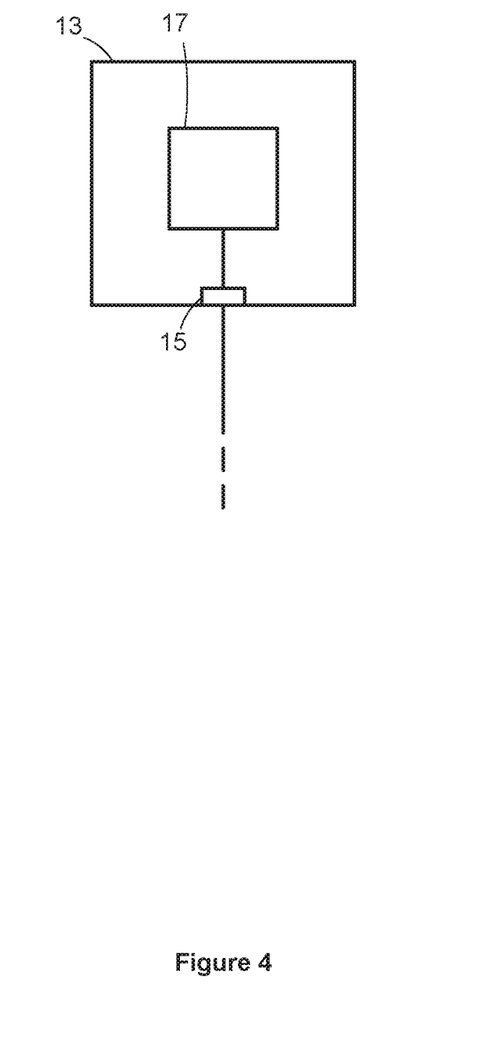
FIG. 4 is a first embodiment of a device of the DSL network of FIG. 2.

A first embodiment of a DSL network 1 of the present invention will now be described in more detail with reference to FIGS. 2 and 4. The DSL network 1 comprises a local exchange 3 (known as 'central office' in US terminology), a street cabinet 5, a distribution point 7, and a first, second and third customer premises 9a, 9b, 9c. First, second and third subscriber lines 11a, 11b, 11c connect first, second and third customer DSL modems 10a, 10b, 10c at the first, second and third customer premises 9a, 9b, 9c to DSL modems located in first, second and third DSLAMs 4, 6, 8 at the exchange 3, cabinet 5 and distribution point 7 respectively. The first, second and third subscriber lines 11a, 11b, 11c are bundled together at intermediate points between the exchange and the cabinet, and the cabinet and the distribution point.

The first, second and third DSLAMs 4, 6, 8 are all connected to the Core Network 2a and Network Management System 2b, via the telephony infrastructure 2c in the exchange 3. The distribution point DSLAM 8 is connected to the cabinet DSLAM 6, and the cabinet DSLAM 6 is connected to the exchange DSLAM 4, such that signalling messages (described later) can be transmitted between them.

The skilled person will understand that the exchange may support multiple customers and multiple cabinets, the cabinet may support multiple customers and multiple distribution points, and the distribution point may support multiple customers. The one-to-one mapping shown in FIG. 1 is for illustrative purposes only.

FIG. 1 also illustrates a hierarchy of levels in the DSL system 1 of this embodiment. The exchange 3 is on a first hierarchy level, L1, the cabinet is on a second hierarchy level, L2, and the distribution point is on a third hierarchy level, L3. A method for allocating resources in the DSL network 1 involving the interaction between the various layers of the hierarchy will now be described with reference to FIG. 3.

Figure 3:
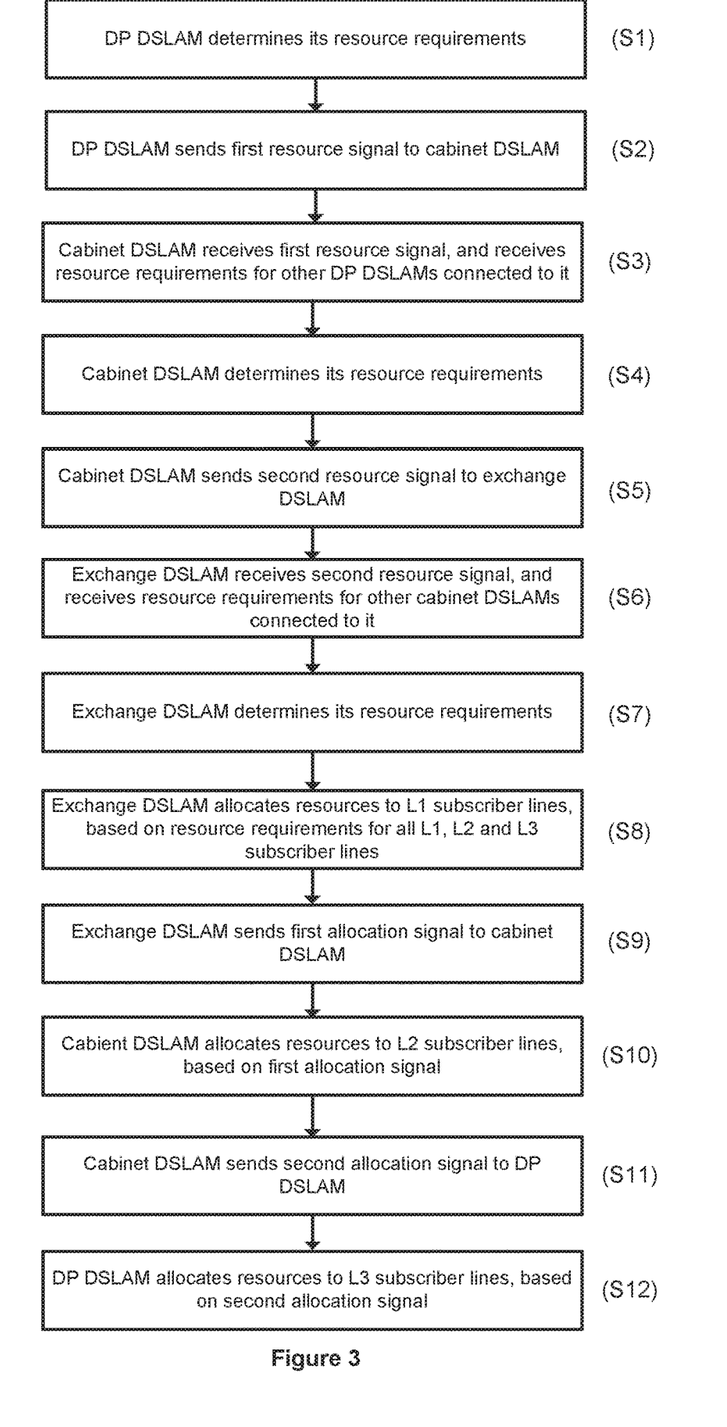
FIG. 3 is a flow diagram illustrating a first embodiment of a method of the present invention.

As a first step, the distribution point DSLAM 8 determines its resource requirements (step S1). The distribution point DSLAM 8 resource requirements relate to the requirements to adequately serve customer premises 9b and all other customer premises connected directly to it. This may be calculated by a resource requirement algorithm, as discussed in more detail below. The distribution point DSLAM 8 then sends a first resource signal, indicating its resource requirements, to the cabinet DSLAM 6 over a signalling channel (step S2).

The cabinet DSLAM 6 receives the first signal, indicating the resource requirements for the distribution point DSLAM 8, and also receives similar resource requirement signals for all other distribution points DSLAMs connected to it (step S3). The cabinet DSLAM 6 therefore receives data relating to the resource requirements for the part of the L3 tier of the DSL network 1 hierarchy connected to that cabinet DSLAM 6.

The cabinet DSLAM 6 also determines its resource requirements (step S4). The cabinet DSLAM 6 resource requirements relate to the resource requirements to adequately serve customer premises 9a and all other customer premises connected directly to it, and to adequately serve the resource requirements for the part of the L3 tier of the DSL network 1 hierarchy connected to the cabinet 5. The cabinet DSLAM 6 then sends a second signal, indicating its resource requirements, to the exchange DSLAM 4 over a signalling channel (step S5).

The exchange DSLAM 4 receives the second signal, indicating the resource requirements for the cabinet DSLAM 6, and also receives similar resource requirement signals for all other cabinet DSLAMs connected to it (step S6). The exchange DSLAM 4 therefore receives data relating to the resource requirements for the parts of the L2 and L3 tiers of the DSL system 1 hierarchy connected to that exchange DSLAM 4.

The exchange DSLAM 4 also determines its resource requirements (step S7). The exchange DSLAM 4 resource requirements relate to the resource requirements to adequately serve customer premises 9c and all other customer premises connected directly to it. The exchange DSLAM 4 therefore receives data relating to the resource requirements for L1 tier customers (i.e. customer premises directly connected to the exchange), and of the L2 and L3 tier customers from the first and second request signals respectively.

The exchange DSLAM 4 may then allocate resources based on this data (step S8). For example, the exchange DSLAM 4 may determine the appropriate tones in the frequency spectrum to allocate to the L1 tier customers, and remove data from all other tones. The exchange DSLAM 4 then transmits a first allocation signal (step S9) to the cabinet DSLAM 6 (and all other cabinet DSLAMs connected to it), indicating the resource allocation for the L2 and L3 tier customers (such as by indicating the tones reserved for the exchange DSLAM, the power levels, and the time period the resource allocation is valid).

The cabinet DSLAM 6 receives the first allocation signal, and then allocates resources to its L2 customers (step S10). For example, the cabinet DSLAM 6 may determine the appropriate tones in the frequency domain (i.e. the spare tones which have not been reserved for the exchange DSLAM 4 and therefore do not overlap with those allocated to the L1 tier customers) and power levels to allocate to the L2 tier customers, and removes data from all other tones. The cabinet DSLAM 6 then transmits a second allocation signal (step S11) to the distribution point DSLAM 8 (and all other distribution point DSLAMs connected to it), indicating the resource allocation for the L3 tier customers (such as by indicating the tones reserved for the cabinet DSLAM and the exchange DSLAM, the power levels and the time period the resource allocation is valid).

The distribution point DSLAM 8 receives the second allocation signal, and then allocates resources to its L3 customers (step S12). For example, the distribution point DSLAM 8 may determine the appropriate tones in the frequency domain and power levels to allocate to the L3 tier customers (which do not overlap with those allocated to the L1 and L2 customers), and removes data from all other tones.

The skilled person will understand that the present invention therefore provides an improved method for allocating resources in the DSL system. In the prior art ANFP technique, resources were allocated to higher-tiers without any knowledge of the requirements of the lower-tiers, such that resources were inappropriately reduced for lower-tiers (for example, when the lower-tiers have a greater proportion of directly connected customers, such that their resource requirements are high and there are few higher-tier customers to interfere with). In the present invention, the resource requirements for each level are taken into account when allocating resources, such that DSL networks with a greater proportion of lower-tier connected customers are allocated greater resources (compared to the ANFP technique) without incurring significant crosstalk on the subscriber lines.

Furthermore, by using signalling messages between the DSLAMs on separate tiers, the DSLAMs are able to allocate resources without the intervention of the Network Management System. The resource requirement algorithms may therefore be implemented autonomously by each DSLAM, distributing the computational load and thus reducing the burden on the Network Management System.

The skilled person will understand that the signalling messages may be sent at any time. That is, the signalling messages may be sent periodically, or it may be triggered by a change in the network (for example, a change in topology or due to an increase in data demand by a set of customers).

The resource requirement algorithm will now be described in more detail. The resource requirement algorithm for any network element (e.g. the exchange DSLAM, the cabinet DSLAM or the distribution point DSLAM) determines the resources required to serve all customers connected to that network element and, if applicable, the resources required to serve all customers connected to any network element in the tier below. The resource requirement algorithm may be implemented in a variety of ways. In a first implementation, the resource requirement algorithm for a network element determines the total number of customers connected to it, and estimates the resources required for all these customers based on, for example, the data rate for each customer, the minimum guaranteed data rate for each customer, average usage data for each customer, historical usage data for each customer, etc. In a second implementation, the resource requirement algorithm for a network element analyses the traffic flowing through it.

Furthermore, topology information for the DSL network 1 may be used (which may also be contained in the first and second resource requirement signals). The topology information may indicate the subscriber line length from the exchange to the cabinet, and from the cabinet to the distribution point, and identifiers for the cables between the various network nodes. The resource allocation algorithm may then determine the levels of attenuation and crosstalk levels when determining its resource requirements.

Furthermore, if a higher-tier DSLAM determines that the resource requirements for the lower-tiers cannot be fulfilled (for example, if meeting these requirements will cause high levels of crosstalk on the higher-tier DSL subscriber lines), it will reject the resource allocation request. In this case, the lower-tier network element sending the resource allocation request will record the request as rejected (this may be on a per tone basis). After a configurable countdown timer has expired, the lower-tier network element will resend the resource allocation request.

As noted above, the lower-tier network elements receive allocation signals from the higher-tier network elements, indicating the resource allocation for that lower-tier (and, if applicable, any further tiers below in the hierarchy). However, the skilled person will understand that this is not essential, as the lower-tier network elements may detect the resources allocated to it. For example, the lower-tier network elements may detect the removal of information from certain tones by the higher-tier network elements. The lower-tier network element may then allocate resources to its customers, such as by avoiding the tones used by the higher-level networks elements and, if applicable, any tones it allocates to any further lower tiers. However, the skilled person will understand that by sending an allocation signal to the lower-tiers, the resource allocation may be expedited and allocated more accurately.

In the above description, the lower-tier network elements receive an allocation signal and allocate resources to its customers accordingly. This allocation may be implemented in a number of ways, for example by one of the On-Line Reconfiguration features of DSL networks, such as:

Type 1: Bit-swapping (in which the line changes the number of bits of information being transmitted on a given tone and reallocates them to another tone with no loss of data rate) supported by ADSL1, ADSL2, ADSL2+, VDSL2 and fast access to subscriber terminals (G.fast) networks;

Type 3: Seamless Rate Adaptation (in which the line can increase or decrease the physical layer rate in order to maintain a target Quality of Service) supported by ADSL2, ADSL2+, VDSL2 and G.fast networks; and Type 4: Save Our Showtime (in which a preconfigured range of tones immediately drops the number of bits transmitted due to sudden loss of Quality of Service on those tones) supported by VDSL2 and G.fast.

An example of a lower-tier network element implementing a resource allocation (either by receiving an allocation signal or by detecting the resources used by higher-tier network elements) will now be described. In this example, the cabinet DSLAM 6 receives an allocation signal from the exchange DSLAM 4. The allocation signal indicates a first set of tones reserved for the exchange DSLAM 4. The cabinet DSLAM 6 then determines a second set of tones to use for transmissions to its customers (which does not conflict with the first set of tones reserved for the exchange DSLAM 4 and a third set of tones which it shall reserve for the distribution point DSLAM 8). The cabinet DSLAM 6 then bitswaps information on the first and third sets of tones to the second set of tones (i.e. Type 1 OLR) and reduces transmit power on the first and third sets of tones. The cabinet DSLAM 6 also uses Seamless Rate Adaptation to lower the rate on the second set of tones (i.e. Type 3 OLR), to increase the margin on those tones and avoid any reduction in Quality of Service. The cabinet DSLAM 6 then sends an allocation signal to the distribution point DSLAM 8 (and all other distribution point DSLAMs connected to that cabinet), indicating the resources available to it.

In another example, the cabinet DSLAM 6 determines a second set of tones to use for transmissions to its customers (which does not conflict with a first set of tones reserved for the exchange DSLAM 4 and a third set of tones which it shall reserve for the distribution point DSLAM 8), in a similar manner to the example above, but then maps the second set of tones to predefined Save Our Showtime groups. The cabinet DSLAM 6 may then immediately drop any groups which are not mapped to the second set of tones, and then use Seamless Rate Adaptation as required to adjust the speed (to save Quality of Service). As before, the cabinet DSLAM 6 then sends an allocation signal to the distribution point DSLAM 8 (and all other distribution point DSLAMs connected to it), indicating the resources available to it. The skilled person will understand that this example expedites the resource allocation.

Although the On-Line Reconfiguration techniques are non-essential, the skilled person will understand that they provide a seamless method of implementing the resource allocation to the network (i.e. which is much faster than implementing the resource allocation by retrains, as in the prior art methods).

In the description above, the DSLAMs receive the request and allocation signals, perform the resource allocation algorithms and implement the allocated resources. FIG. 4 illustrates a DSLAM 13 for implementing the method of the present invention, including a transceiver 15 for terminating a subscriber line, for receiving the request signals and for sending allocation signals; and a processor 15 for performing the resource allocation algorithms and to implement the allocated resources. This DSLAM 13 may be used at the either the exchange, cabinet or distribution point. However, the skilled person will understand that it is not essential for these functions to be performed by the DSLAM. Any network element in the DSL network may be configured to perform the above functions (although the DSLAM is the most appropriate component in the DSL network).

The skilled person will understand that any combination of features is possible within the scope of the invention, as claimed.

What is claimed is:

1. A method for allocating resources in a DSL network, the DSL network having a hierarchy including a first and second tier, the method comprising the steps of:
    a first-tier DSL network element receiving a resource requirement of a second-tier DSL subscriber line from a second-tier DSL network element;
    the first-tier DSL network element determining a resource requirement of a first-tier DSL subscriber line; and
    the first-tier DSL network element allocating resources to the first-tier DSL subscriber line based on the resource requirements of the first and second tier DSL subscriber lines.

2. The method as claimed in claim 1, further comprising the steps of:
    a second-tier DSL network element determining the resources allocated to the first-tier DSL subscriber line; and
    the second-tier DSL network element allocating resources to the second-tier DSL subscriber line based on the resources allocated to the first-tier DSL subscriber line.

3. The method as claimed in claim 1, wherein the DSL hierarchy further includes a third tier, the method comprising the steps of:
    the first-tier DSL network element receiving a resource requirement of the second-tier DSL subscriber line and a third-tier DSL subscriber line from the second-tier DSL network element; and
    the first-tier DSL network element allocating resources to the first-tier DSL subscriber line based on the resource requirements of the first, second and third DSL subscriber lines.

4. The method as claimed in claim 3, further comprising the steps of:
    the second-tier DSL network element determining the resources allocated to the first-tier DSL subscriber line; and
    the second-tier DSL network element allocating resources to the second-tier DSL subscriber line based on the resources allocated to the first-tier DSL subscriber line and the resource requirements of the third DSL subscriber line.

5. The method as claimed in claim 4, further comprising the steps of:
    the third-tier DSL network element determining the resources allocated to the first-tier and second-tier DSL subscriber lines; and
    the third-tier DSL network element allocating resources to the third-tier DSL subscriber line based on the resources allocated to the first-tier and second-tier DSL subscriber lines.

6. The method as claimed in claim 1, wherein resources are also allocated based on a topology of the DSL network.

7. The method as claimed in claim 1, wherein the DSL network elements are aggregation transceiver devices.

8. The method as claimed in claim 1, wherein the resource allocation is implemented by an On-Line Reconfiguration technique.

9. A non-transitory computer-readable medium configured to store a computer program which, when executed on a computer, causes the computer to perform the steps of the method of claim 1.

10. A device for allocating resources in a DSL network, the DSL network having a hierarchy including a first and second tier, the device disposed on the first-tier and comprising
    a receiver adapted to receive resource requirement data relating to a second-tier DSL subscriber line from a second-tier DSL network element; and
    a processor adapted to determine a resource requirement of a first-tier DSL subscriber line, and further adapted to allocate resources to the first-tier DSL subscriber line based on the resource requirements of the first-tier and second-tier DSL subscriber lines.

11. The device as claimed in claim 10, wherein the DSL network hierarchy further includes a third tier, the receiver is further adapted to receive resource requirement data relating to the third-tier DSL subscriber line from the second-tier DSL network element, and the processor is further adapted to allocate resources to the first-tier DSL subscriber line based on the resource requirements of the first-tier, second-tier and third-tier DSL subscriber lines.

12. The device as claimed in claim 10, wherein the resources are also allocated based on a topology of the DSL network.

13. The device as claimed in claim 10, being an aggregation transceiver device.

14. The device as claimed in claim 10, wherein resource allocations are implemented by On-Line Reconfiguration.

15. A device for allocating resources in a DSL network, the DSL network having a hierarchy including a first and second-tier, the device disposed on the second-tier and comprising
    a processor adapted to determine a resource requirement of a second-tier DSL subscriber line; and
    a transmitter adapted to send the resource requirement of the second-tier DSL subscriber line to a first-tier network element,
    wherein the processor is further adapted to:
        determine resources allocated to a first-tier DSL subscriber line by the first-tier network element, and
        allocate resources to the second-tier DSL subscriber line based on the resources allocated to the first-tier DSL subscriber line.

16. The device as claimed in claim 15, wherein the DSL network hierarchy further includes a third tier, and the transmitter is a transceiver adapted to receive the resource requirements of a third-tier DSL subscriber line from a third-tier DSL subscriber line and to send the resource requirement of the third-tier DSL subscriber line to the first-tier network element.

17. The device as claimed in claim 16, wherein the processor is further adapted to allocate resources to the second-tier DSL subscriber line based on the resources allocated to the first-tier DSL subscriber line and the resource requirements of the third-tier DSL subscriber line.

18. The device as claimed in claim 15, wherein resources are also allocated based on a topology of the DSL network.

19. The device as claimed in claim 15, being an aggregation transceiver device.

20. The device as claimed in claim 15, wherein resource allocations are implemented by On-Line Reconfiguration.

* * * * *